United States Patent [19]
Phillips et al.

[11] Patent Number: 5,170,857
[45] Date of Patent: Dec. 15, 1992

[54] MOTORIZED WEIGHING CONVEYOR

[75] Inventors: Howard C. Phillips, Bristol; Jeffrey Hoffman, Caledonia; Michael B. Henrickson, Racine, all of Wis.

[73] Assignee: Cintex of America Inc., Kenosha, Wis.

[21] Appl. No.: 592,725

[22] Filed: Oct. 4, 1990

[51] Int. Cl.⁵ .......................................... G01G 19/00
[52] U.S. Cl. .................................................. 177/145
[58] Field of Search ........................................ 177/145

[56] References Cited

U.S. PATENT DOCUMENTS

| | | |
|---|---|---|
| 3,799,328 | 3/1974 | Harvey . |
| 4,023,668 | 5/1977 | De Santo .................... 177/145 X |
| 4,440,249 | 4/1984 | Del Rosso ..................... 177/145 |
| 4,564,077 | 1/1986 | Del Rosso ..................... 177/145 |
| 4,570,729 | 2/1986 | Del Rosso ..................... 177/145 |
| 4,863,419 | 9/1989 | Sansone . |
| 4,932,488 | 6/1990 | Tsay ............................. 177/145 |

Primary Examiner—George H. Miller, Jr.
Attorney, Agent, or Firm—Quarles & Brady

[57] ABSTRACT

A dynamic check weighing system wherein the drive motor is positioned within the channel members of the frame and spaced from the ends thereof so as to provide a dynamically balanced system resulting in accurate and consistent weighing. The conveyor belt is of an open mesh type which affords positive engagement by a drive sprocket and positive tracking by a guide sprocket. A direct drive arrangement is employed thus eliminating drive components. There is provided a weighing system which employs fewer parts, thus, reducing maintenance and production costs.

5 Claims, 2 Drawing Sheets

MOTORIZED WEIGHING CONVEYOR

BACKGROUND OF THE INVENTION

This invention relates to a motorized weighing conveyor for use in conjunction with material handling equipment which includes conveyors. More particularly, it relates to an improved motorized weighing conveyor which is compact in design and employs a minimum number of parts.

Motorized weighing conveyors are well known. For example, in U.S. Pat. No. 4,023,668 an endless belt conveyor is driven by a drive train and a motor. This patent describes a multicomponent drive arrangement for the conveyor in the form of chains and a sprocket, as well as a motor, all of which are displaced outside from the conveyor platform. U.S. Pat. Nos. 4,564,077 and 4,570,729 also show drive motors and gear reducers for check weighing machines mounted outside the conveyor platform. In U.S. Pat. No. 4,440,249 a drive roller for a motorized weighing conveyor is shown with the drive roller housing an electric motor. In U.S. Pat. Nos. 3,799,328 and 4,863,419 conveyor belts are disclosed which are composed of a molded plastic material.

The previously referred to prior art mechanisms employ either multicomponent drive mechanisms for weighing conveyors which are complex or are not dynamically balanced. The prior art mechanisms effect undesired vibration of the weighing conveyor which can adversely affect weighing calculations. Neither do the prior art weighing devices afford tracking and ease of replacement of the conveyor belts.

Accordingly, it is an advantage of this invention to provide an improved motorized weighing conveyor which employs a fewer number of components, and is dynamically balanced and light weight as well as easily controlled so as to provide accurate and consistent weighing.

It is another advantage of this invention to provide a motorized weighing conveyor which affords positive tracking of the conveyor belt as well as ease of replacement.

It is still another advantage of this invention to provide a motorized weighing conveyor of the foregoing type which can be operated for long periods of time without repair, thus reducing maintenance costs.

It is yet another advantage of this invention to provide a motorized weighing conveyor of the foregoing type which can be easily repaired, thus reducing production downtime.

SUMMARY OF THE INVENTION

The foregoing advantages are accomplished, and the shortcomings of the prior art are overcome by the dynamic check weighing system of this invention which includes a weighing means operatively mounted on a support frame. A conveyor mechanism is operatively associated with the weighing means and the conveyor mechanism includes side channels and a top face. A conveyor belt is operatively positioned to ride on the top face of the conveyor mechanism. A motor is positioned between the side channels and between ends of the conveyor mechanism. A drive shaft means is operatively positioned between the side channels and in a driving relationship with respect to the conveyor belt. Direct drive means are operatively connected between the motor and the drive shaft means.

In a preferred manner, the conveyor belt is composed of plastic mesh having openings and the drive shaft means includes a sprocket with teeth for engaging the openings in the plastic mesh. A guide sprocket also having teeth is positioned at an end of the conveyor opposite the drive shaft means for engaging the openings in the plastic mesh.

In one aspect the conveyor belt is a molded plastic which can be easily assembled or disassembled.

Also preferably, the direct drive means includes a pulley driven by the motor and a belt driven by the pulley for driving the drive shaft means.

In another aspect, the motor is a DC drive motor and the direct drive means includes a gear reducer with a drive shaft which is positioned approximately midway between the ends of the conveyor mechanism.

In yet another aspect, the invention contemplates a conveyor mechanism by itself as a transport mechanism without the weighing means or the support frame or separated therefrom.

BRIEF DESCRIPTION OF THE DRAWINGS

A better understanding of the present invention can be accomplished by reference to the drawings wherein.

DETAILED DESCRIPTION OF THE PREFERRED EMBODIMENTS

Figure 1:
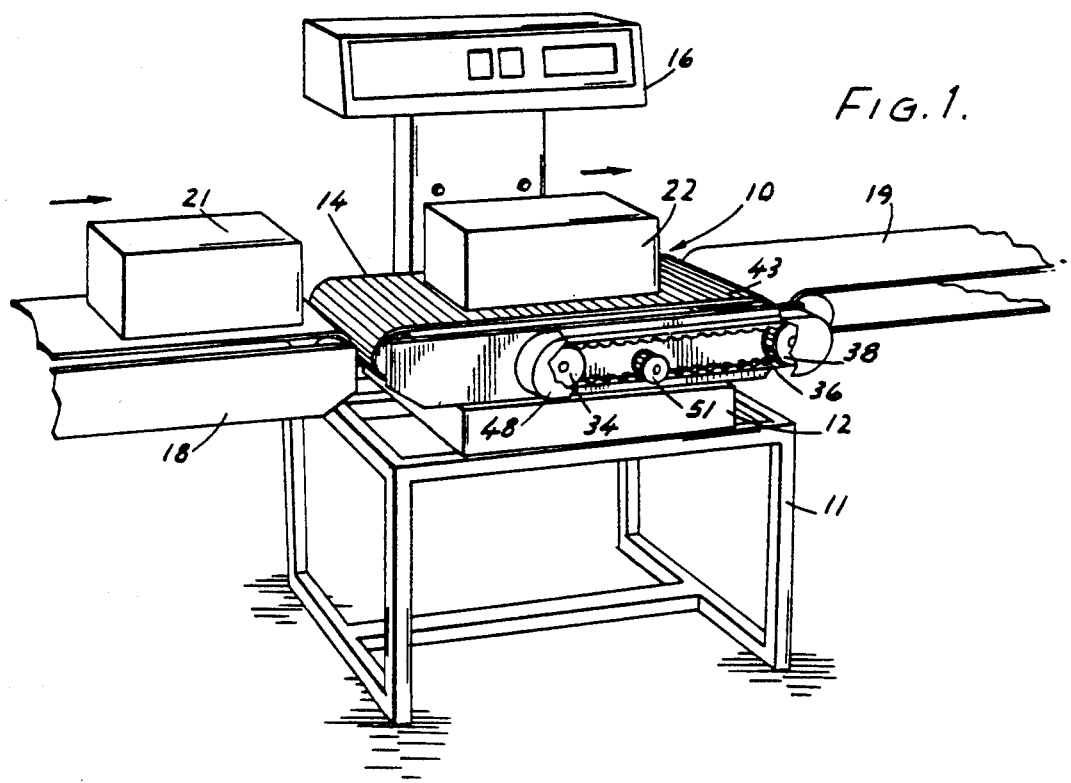
FIG. 1 is a perspective view of the dynamic check weighing system of this invention.

Referring to FIG. 1, the motorized weighing conveyor generally 10 includes a base frame 11 and a load cell section 12 on which is positioned the conveyor section 14. A console section 16 provides a control center for the conveyor 10 as well as a reading of the weight of the package 22 as detected by the load cell section 12. Infeed conveyor 18 transports package 21 onto conveyor section 14 and outfeed conveyor 19 receives the weighed packages 21 and 22.

Figure 2:
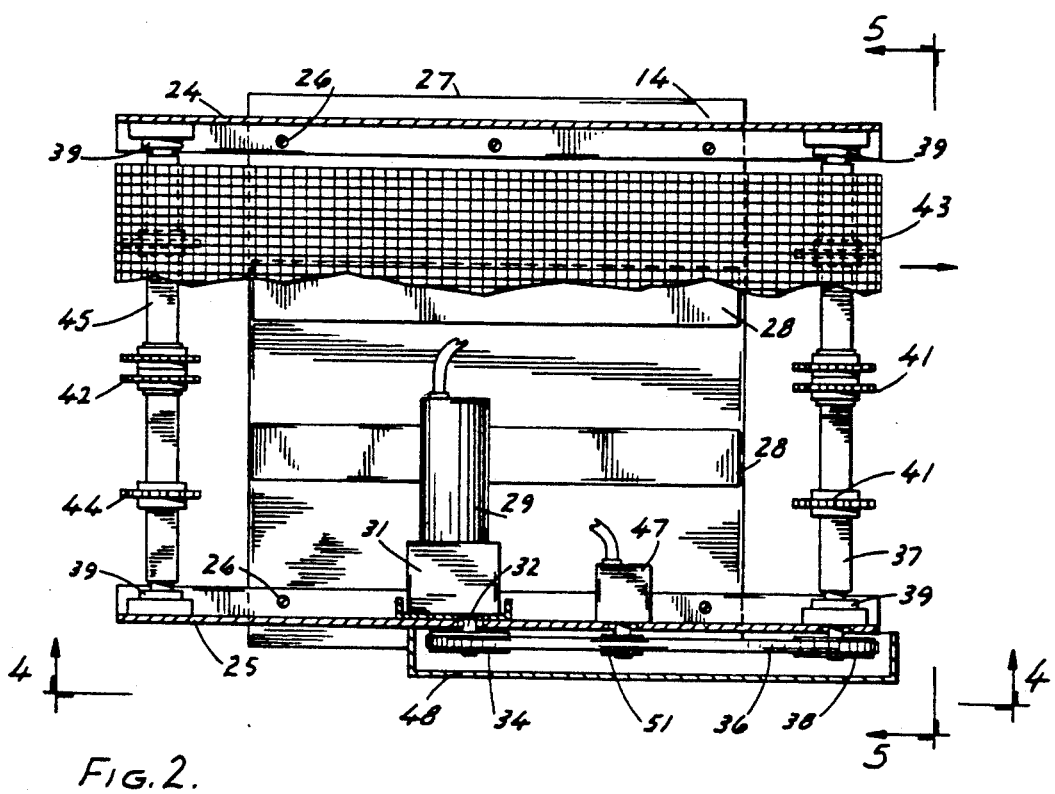
FIG. 2 is a top plan view of the conveyor section shown in FIG. 1 with a portion broken away showing the drive and guide means for the conveyor belt.
Figure 3:
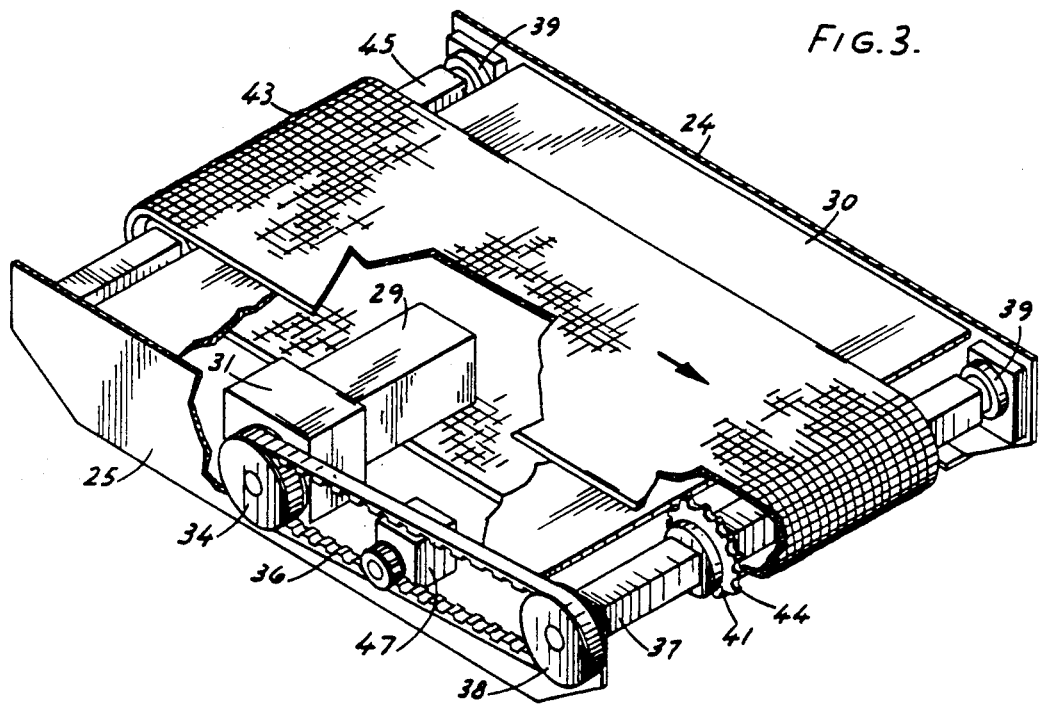
FIG. 3 is a perspective view of the conveyor section shown in FIG. 2 with portions broken away further illustrating the drive means.
Figure 4:
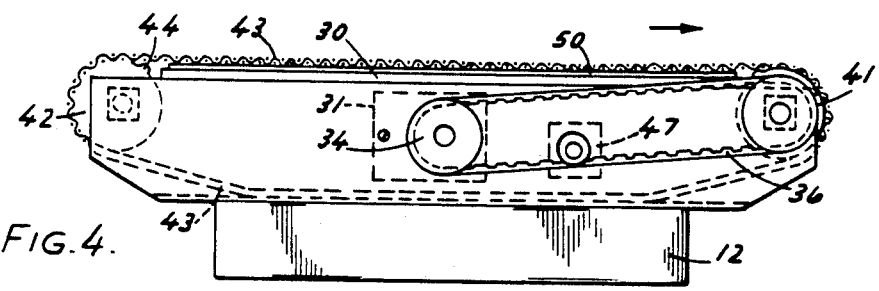
FIG. 4 is a side view in elevation taken along line 4—4 of FIG. 2 but with the shield for the pulleys and the belt removed.
Figure 5:
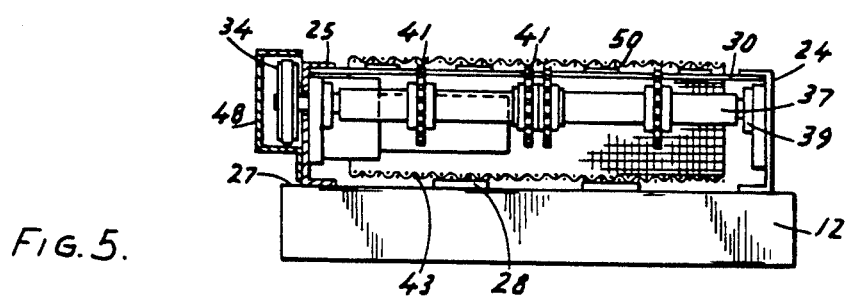
FIG. 5 is an end view in elevation taken along line 5—5 of FIG. 2.

As best seen in FIGS. 2 and 3 the conveyor section 14 is defined by two opposing L-shaped channel members 24 and 25, which are fastened to a platform 27 of the load cell section 12 by the bolts 26. Two slide bars 28 are positioned on the platform 27 to slidably support the lower section of the conveyor belt 43. This is best seen in FIG. 5. Secured to the inside of channel member 25 is the gear reducer 31 and the D.C. drive motor 29. A drive shaft 32 extends from the gear reducer 31 and through the channel member 25. It is connected to the drive pulley 34 which drives the driven pulley 38 by the drive belt 36. The driven pulley 38 in turn drives the drive shaft 37 which is journalled between the channel members 24 and 25 by the bearings 39. Connected to drive shaft 37 in a nonrotatable manner are the drive sprockets 41 having teeth 44 for engaging the openings 40 in the conveyor belt 43, which is of a molded plastic mesh type. Belt 43 is available from the Intralox Company located in New Orleans. It is of one piece construction with the ends joined by a pin so that it is easily taken apart or put together.

At the opposite end of the conveyor section 14 is a guide shaft 45 extending between the channel members 24 and 25 and journalled in the bearings 39 in a manner similar to the drive shaft 37. It also has the sprockets 42, positioned in a nonrotatable manner on the shaft 37, with teeth 44 to engage and guide the mesh conveyor belt 43.

As best seen in FIGS. 3 and 5 an upper support plate 30 extends between the channel members 24 and 25. It has the four slide bars 50 to support the upper section of the conveyor belt 43. Referring to FIGS. 2 and 5 it is seen that there is a shield 48, which is attached to the outside of channel member 25 for covering the pulleys 34 and 38 as well as the drive belt 36 and the pulley 51 of an encoder 47. This allows for easy replacement of the belt.

Important features of the motorized weighing conveyor 10 include the following: First, the motor 29 and the gear reducer 31 are positioned between the conveyor side channel members 24 and 25 with the drive shaft of the gear reducer positioned approximately midway between the ends of the conveyor mechanism. In addition a direct drive means is employed as represented by the drive pulley 34, the driven pulley 38 and the belt 36 for driving the drive shaft 37. These features effect a dynamic balance and minimization of vibration to result in a more accurate and consistent weighing. A reduction in weight is also effected. Second, a molded plastic belt 43, with the sprockets 41 and 42 is employed. This results in a positive drive and tracking of the belt which is difficult when short and wide conveyor belts are utilized. Third, the conveyor belt 43 rides over the slide bars 28 and 50. This eliminates the need for support and tension rollers and minimizes drag of the belt 43. Fourth, a D.C. drive motor 29 is utilized to provide control with variable speed capability. Fifth, the direction of the conveyor 10 is easily reversed when desired by the removal of the bolts 26, turning the conveyor section 14 180° and replacing the bolts 26.

It will thus be seen that through the present invention there is now provided a motorized weighing conveyor 10 which is dynamically stable to provide accurate weighing at high speeds. Few components are employed, thus, reducing cost and maintenance. A self tracking belt and sprocket arrangement is employed with easy removal of the belt for repair or replacement. In addition, a change of direction of the conveyor is easily accomplished.

It will also be recognized that while the channel members 24 and 25 have been shown as L-shaped, other configurations could be employed such as U or T-shapes.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

We claim:

1. A dynamic check weighing system comprising:
   weighing means operatively mounted on a support frame;
   a conveyor mechanism operatively associated with said weighing means, said conveyor mechanism including side channels and a top face;
   a conveyor belt operatively positioned to ride on te top face of said conveyor mechanism;
   a motor positioned between said side channels and between ends of said conveyor mechanism;
   drive shaft means operatively positioned between said side channels and in a driving relationship with respect to said conveyor belt, said conveyor belt being composed of plastic mesh having openings therethrough and said drive shaft means is defined by a sprocket for engaging said openings in said plastic mesh; and
   direct drive means operatively connected between said motor and said drive shaft means.

2. The dynamic check weighing system of claim 1 further including guide sprocket means positioned at an end of said conveyor mechanism opposite said drive shaft means for engaging said openings in said plastic mesh.

3. The dynamic check weighing system of claim 1 wherein said plastic mesh is a molded plastic.

4. A dynamic check weighting system comprising:
   weighing means operatively mounted on a support frame;
   a conveyor mechanism operatively associated with said weighing means, said conveyor mechanism including side channels and a top face;
   a conveyor belt operatively positioned to ride on the top face of said conveyor mechanism;
   a motor positioned between said side channels and between ends of said conveyor mechanism;
   drive shaft means operatively positioned between said side channels and in a driving relationship with respect to said conveyor belt; and
   direct drive means operatively connected between said motor and said drive shaft means, said direct drive means including a first pulley driven by said motor and a belt driven by said first pulley for driving said drive shaft means, said first pulley, said belt and a second pulley driven by said belt being positioned outside one of said side channels.

5. The dynamic check weighting system of claim 4 wherein said direct drive means includes a gear reducer with a drive shaft which is positioned approximately midway between the ends of the conveyor mechanism.

* * * * *